Nov. 14, 1944.  G. HOHWART  2,362,554

CYLINDRICAL PLUG GAUGE WEAR TESTING DEVICE

Filed Dec. 29, 1943  2 Sheets-Sheet 1

INVENTOR.
George Hohwart.
BY
Harness, Dickey & Pierce.
ATTORNEYS.

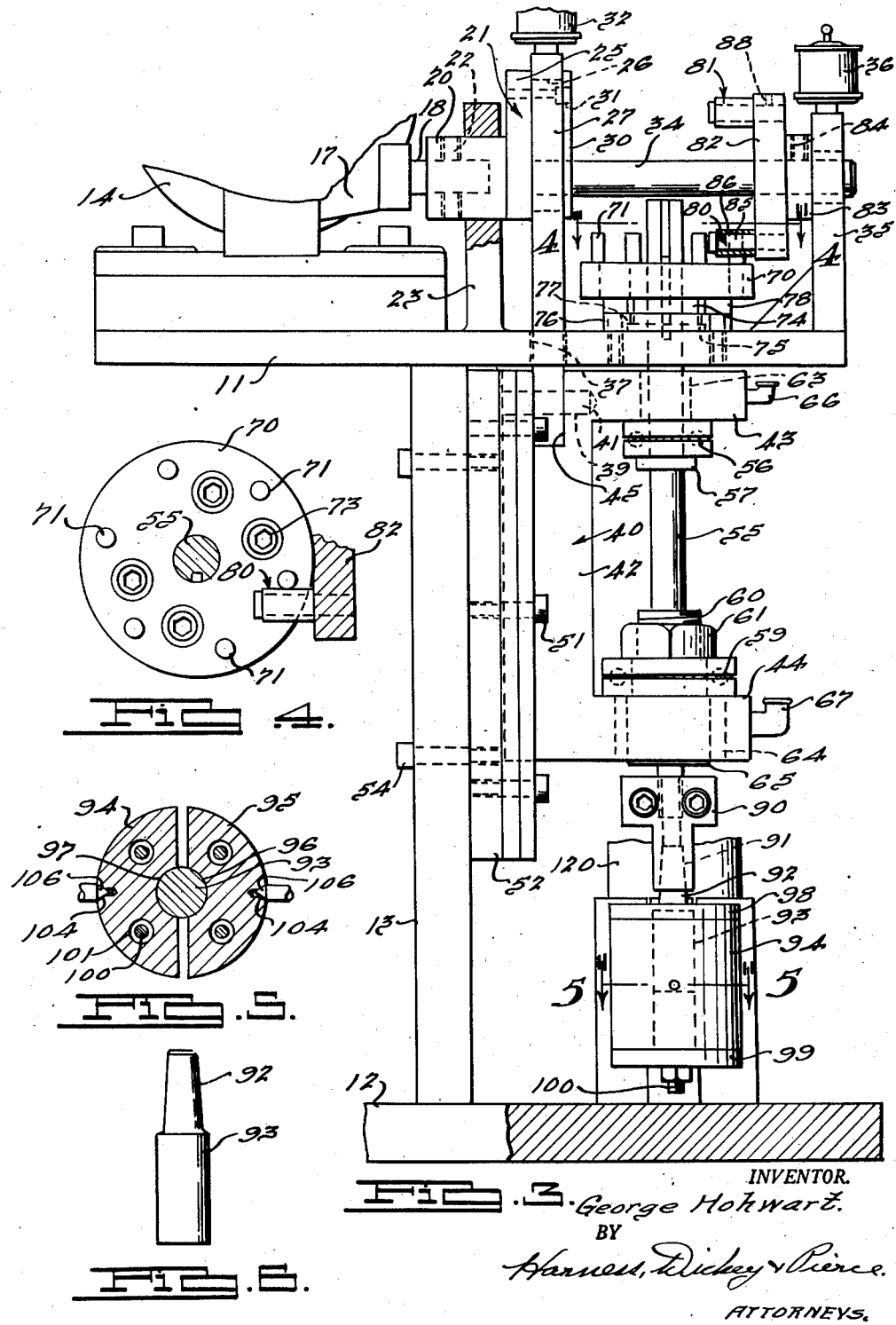

Patented Nov. 14, 1944

2,362,554

UNITED STATES PATENT OFFICE 2,362,554

CYLINDRICAL PLUG GAUGE WEAR TESTING DEVICE

George Hohwart, Orchard Lake, Mich., assignor to N. A. Woodworth Company, Ferndale, Mich., a corporation of Michigan Application December 29, 1943, Serial No. 516,022

8 Claims. (Cl. 73—7)

The invention relates to wear testing mechanisms and it has particular relation to a mechanism for testing the wear qualities of a gauge member.

In the use of cylindrical plug gauges, for instance, one reason why it is important to know the wearing qualities of the gauge is that continued accuracy of the gauge is directly affected. If the wearing qualities can be accurately determined, improvement in such qualities can be made with reliability by using various metals or alloys. Furthermore, it is important to know the wearing qualities of the gauge for the reason that its useful life may be fairly well determined beforehand and this information is helpful to manufacturers of the gauge and those using the gauge. From this it will be seen that it is important to know how long a gauge will last with a desired range of accuracy and this is especially helpful to the manufacturer of gauges since it enables such manufacturer to improve his product and to realize how efficient or good such product is as compared to products manufactured by others.

One object of the invention is to provide an improved wear testing mechanism for testing the wearing qualities of a gauge member and to effect this testing in an accelerated manner under wear conditions similar to those present in the actual use of the gauge member.

Another object of the invention is to provide a mechanism of the above identified character which can be readily and accurately adjusted in order to vary the wearing pressures.

Another object of the invention is to provide a mechanism of this character which is inexpensive to manufacture and which may be easily operated by anyone given the task of testing gauge members.

Other objects of the invention will become apparent from the following specification, from the drawings to which it relates and from the claims hereinafter set forth.

For a better understanding of the invention reference may be had to the accompanying drawings wherein:

Figure 3 is a view of the mechanism shown by Figure 2 as seen from the lefthand side thereof;

Figure 4 is a cross-sectional view taken substantially along the line 4—4 of Figure 3;

Figure 5 is a cross-sectional view taken substantially along the line 5—5 of Figure 3;

Figure 6 is a detailed view illustrating a plug gauge adapted to be tested by the mechanism.

Figures 1, 2:
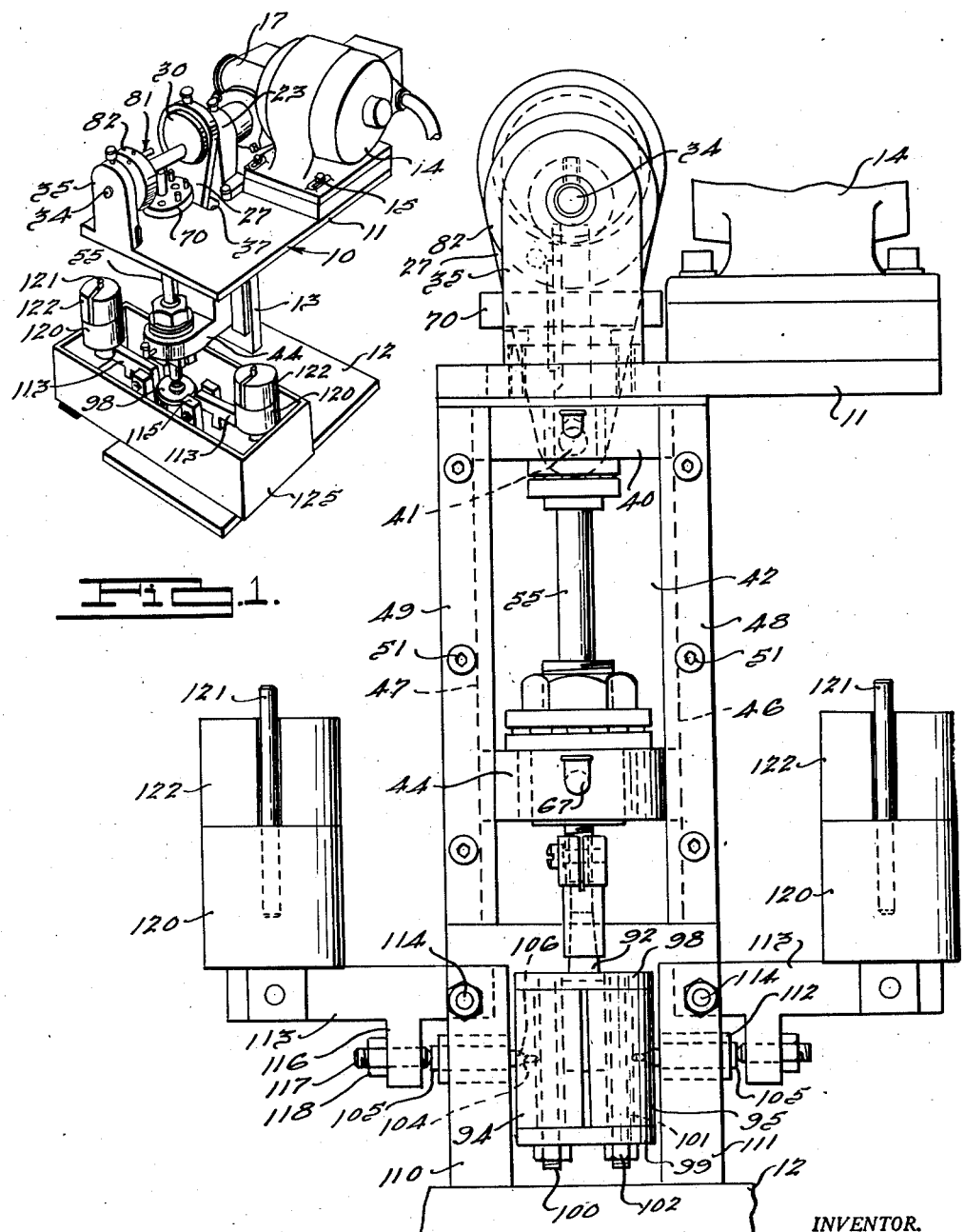
Figure 1 is a perspective view illustrating a mechanism constructed according to one form of the invention.
Figure 2 is an enlarged elevational view of the principal parts of the mechanism as seen from the lefthand end of the mechanism shown by Figure 1.

Referring to Figures 1, 2 and 3, a support for the mechanism is indicated generally by the numeral 10 and comprises an upper plate 11, a lower plate 12 and a vertical, connecting plate of column 13. An electric motor 14 is adjustably mounted on the upper plate 11 by the usual bolts 15 and the shaft of the motor at one end extends into a reduction gearing 17. The latter in turn has a cross shaft 18 projecting therefrom, as best shown by Figure 3, and into a hub 20 forming part of an eccentric 21. Such shaft is drivingly connected to the hub by means of any suitable fastening device such as set screws 22 and the hub is journaled in a bearing bracket 23 mounted on the plate 11.

The eccentric has a circular cross head 25 disposed eccentrically to the shaft 18 and this cross head has a cylindrical surface 26 of smaller diameter which turnably fits in a corresponding opening in a vertically reciprocatory connecting rod 27. The surface 26 and opening receiving it are both eccentric to the shaft 18 and hence when the shaft is rotated the member 27 will be reciprocated in a vertical direction. An outer plate 30 disposed at the side of the member 27 opposite the hub 28, serves to hold the member 27 against axial displacement and is fastened to the plate 25 by means of a screw 31. At the upper end of the member 27, a grease fitting 32 is provided so that the cylindrical surface 26 may be properly lubricated. A shaft 34 aligned with the shaft 18 is drivingly keyed or secured to the cross head 21, and is journaled in a bearing bracket 35 disposed in substantially spaced relationship to the cross head. A lubricating fitting 36 is provided to lubricate the bearing in this bracket so that the shaft may turn freely.

The member 27 projects downwardly through an opening 37 in the plate 11 sufficiently large to permit the required movement of the member and below the plate, the member 27 projects into a notch 39 in a frame 40 and is pivotally connected thereto as indicated at 41. This frame includes a vertically extending back 42 and horizontal legs 43 and 44 disposed in vertically spaced relationship. As best shown by Figure 2, the vertical back 42 of the frame has flanges 46 and 47 at opposite edges and these are held in guide elements 48 and 49 having notched inner edges fitting the flanges 46 and 47. The guide members 48 and 49 are fastened by screws 51 to a plate 52, shown best by Figure 3, and this plate in turn is fastened by screws 54 to the vertical supporting column 13. From this it should be understood that the frame 40 has its opposite edges guided vertically in guideways and that it is reciprocated in a true vertical direction by the movement of member 27.

The legs 43 and 44 provide a support for a shaft 55 which extends upwardly through the leg 43 and through the plate 11 and downwardly through the leg 44. An upper thrust bearing 56 is disposed at the underside of the leg 43 and this is engaged by an integral collar 57 on the shaft 55. A lower thrust bearing 59 is provided at the upper side of the leg 44 and in order to obtain a proper thrust bearing engagement the shaft has a threaded portion projection 60 and a nut 61 thereon which engages the lower thrust bearing. A sleeve bearing 63 is provided around the shaft 55 in an opening in the leg 43 and a similar but larger bearing 64 is provided in the lower leg 44 around an enlarged portion 65 on the shaft. It might be observed in this connection that the opening and bearing for that part of the shaft projecting through the leg 44 are relatively large so as to permit vertical assembly of the shaft and bracket. The bearings may be lubricated by fittings indicated at 66 and 67.

That end of the shaft 55 above the plate 11 is splined to a circular pin wheel 70, having a series of circumferentially spaced pins 71 projecting above its upper surface. The plate 70 is fastened by bolts 73 to an intermediate plate 74 disposed at its lower side and this intermediate plate has an annular flange 75 which is engaged by a ring 76 having an overhanging flange 77. The ring 76 is fastened to the plate 11 by bolts 78. From this it should be apparent that the wheel 70 may rotate while being held in position by the ring 76 and that the shaft 55 may slide vertically through the wheel while still maintaining driving connection therewith.

Each of the pins 71 serves as an indexing pin and is adapted to be engaged by diametrically opposed roller elements 80 and 81 secured to a wheel 82 having a hub portion 83 drivingly secured to the shaft 34 by a set screw 84. Each of the elements 80 and 81 may comprise a pin 85 having a sleeve 86 turnable thereon and the inner end of the pin projects into an opening in the wheel 82 and is secured therein by a set screw 88. The arrangement is such that upon each half rotation of the wheel 82, the wheel 70 and shaft 55 are turned through one-sixth of a revolution. It will be appreciated that the mechanism may be adjusted as by changing the location of elements 80 and 81 so that such partial rotation will occur at any desired point in the reciprocatory movement of the connecting rod member 27, but in the embodiment shown such elements 80 and 81 will turn the shaft 55 through one-sixth of a revolution when the reciprocatory member 27 reaches the top of its stroke and when it reaches the bottom of its stroke. In such case the turning will occur while the eccentric is so moving that there is very little vertical movement of the shaft 55.

Below the leg 44 of the frame 40, the shaft 55 is secured to an element 90 having a tapered socket 91 adapted to receive the tapered shank 92 of a cylindrical plug gauge 93. The tapered fit on the shank 92 is such as to hold the element 90 and plug gauge connected for movement together, or in other words, a sufficiently positive lock is provided by the taper. For producing wear on the cylindrical portion of the gauge, wear members 94 and 95 are provided, as best shown by Figure 5, and these members have cylindrical inner surfaces 96 and 97 shaped to fit the cylindrical surface 93 of the plug gauge within close limits of accuracy. It might be stated in this connection that the fit which is desired is one which will substantially correspond to those wear conditions generally prevailing when the gauge is in actual use. The wear members 94 and 95 are retained in assembled relationship by upper and lower plates 98 and 99, shown best by Figure 2, and pins 100 fastened to the upper plate and extending downwardly through enlarged openings 101 in the wear members and through the lower plate. Nuts 102 on the lower ends of the pins hold the plates together but enough play is permitted vertically that the wear members may adjust their positions laterally and otherwise so as to obtain full surface engagement with the plug gauge.

Each of the wear members 94 and 95 directly at the center of its exterior surface has a substantially conical opening 104 and a pin 105 radial to the member has a substantially conical end 106 substantially fitting the conical opening 104. This engagement is such as to position the wear members substantially against vertical movement while allowing the adjustment previously mentioned to insure full surface contact with the plug gauge. A spherical engagement might be provided instead of a conical engagement might be provided if at any time it was found desirable.

The pins 105 are slidable through legs 110 and 111 projecting upwardly from the lower plate 12 and each pin preferably is slidable in a bearing 112 anchored in the leg. In order to apply pressure against the outer end of the pin, a lever 113 is pivotally connected to the upper end of the leg 110 by means of a bolt 114 and as will be seen by Figure 1, the upper end of each of the legs 110 and 111 is bifurcated as indicated at 115 in order to receive the lever. A projection 116 depending from the lever 113 has a stud 117 threaded therethrough and into engagement with the outer end of the pin 105 and the stud is held in adjusted position by a lock nut 118. The outer end of each lever has a weight 120 thereon and a pin 121 projecting upwardly from the weight permits the addition of other weights such as that indicated at 122. From this it will be clear that adjustable pressure may be applied to the wear members so as to apply adjustable pressure against the surface of the plug gauge.

In connection with the mechanism described, it might be stated here that the wear members 94 and 95 preferably are made of "Hytest" cast iron, and the internal surfaces are finished accurately. The gauge members may comprise different steels such as those carbonized, hardened, cooled and then finished, to provide the customary finish for gauges. Additionally, the wear surfaces should be cooled so as to avoid the effect of heat and in order to provide a coolant, a pan 125 may be provided around the wear parts. While various coolants may be used under certain circumstances, it has been found that distilled water is suitable. This coolant is placed in the pan to a depth just above the wear members. In addition, it might be stated that each gauge member must be thoroughly cleaned and de-magnetized before a test may be conducted and this applies also to the wear members.

During operation, the motor operates constantly and the plug gauge is reciprocated between the two wear members. At the end of each downward movement of the plug gauge and at the upper end of each upward movement thereof, the gauge is turned through one-sixth of a revolution and, consequently, each vertical movement of the plug gauge occurs with the gauge in a position turned through one-sixth of a revolution from its preceding position. As this movement occurs, the weighted levers apply pressure to the wear parts so as to provide a wearing contact which may correspond to wearing that occurs through repeated use of the gauge and this pressure is distributed uniformly due to the universal mounting of the wear member which insures full surface contact. Accelerated tests on plug gauges may be thus made efficiently under conditions corresponding to those prevailing during actual use of the gauges.

While only one form of the invention has been illustrated and described in detail, it will be apparent to those skilled in the art that various modifications may be made without departing from the scope of the appended claims.

What is claimed is:

1. A wear testing mechanism for testing a gauge member having a cylindrical gauge surface, comprising a wear member adapted to be pressed against said surface, means for pressing the wear member against the surface, means for reciprocating the members relatively along the axis of the surface, and means for automatically turning the members relatively substantially at the completion of each stroke in the reciprocatory movement.

2. A wear testing mechanism for testing a gauge member having a cylindrical gauge surface, comprising a plurality of mating wear members adapted to be pressed against said surface, means for pressing the wear members against said surface, means for reciprocating the gauge member along the axis of said surface, and means for automatically turning the gage member about said axis and through a predetermined angle at the end of each reciprocatory movement of such member.

3. A wear testing mechainsm for testing a gauge member having a cylindrical gauge surface comprising a plurality of mating wear members having cylindrical surfaces adapted to be pressed against said surface, means movably supporting said wear members so that the entire surface of each is held substantially in contact with the surface of the gauge member, means for pressing the wear members against the gauge member, means for reciprocating the gauge member and wear members relatively along the axis of the cylindrical surface, and means for automatically turning the gauge member and wear members relatively and in predetermined timed relation to the reciprocatory movement.

4. A wear testing mechanism for testing a gauge member having a cylindrical gauge surface comprising a support, a driven shaft on said support, a frame slidably mounted on said support for movement transversely to said shaft, a rotary, second shaft journaled in said frame and being movable with the frame, means on one end of the second shaft for carrying the gauge member, wear members movably mounted on the support and adapted to contact the cylindrical surface of the gauge member, means on the first shaft and frame for reciprocating the latter as the first shaft is rotated, and means for automatically turning the second shaft through a predetermined angle at predetermined times during rotation of the first shaft.

5. A wear testing mechanism for testing a gauge member having a cylindrical gauge surface comprising a support, a driven shaft on said support, a frame slidably mounted on said support for movement transversely to said shaft, a rotary, second shaft journaled in said frame and being movable with the frame, means on one end of the second shaft for carrying the gauge member, wear members movably mounted on the support and adapted to contact the cylindrical surface of the gauge member, means on the first shaft and frame for reciprocating the latter as the first shaft is rotated, a plate splined on the second shaft and having indexing pins arranged circumferentially thereon, and means including a member on the first shaft having means thereon for engaging the pins at intervals during rotation of the first shaft so as to index the second shaft to a new position.

6. A wear testing mechanism for testing a gauge member having a cylindrical gauge surface comprising a support, a driven shaft on said support, a frame slidably mounted on said support for movement transversely to said shaft, means interconnecting said shaft and frame for effecting reciprocation of said frame on said support upon rotation of said shaft, a rotary, second shaft journaled in said frame and being movable with the frame, means on one end of the second shaft for carrying the gauge member, wear members having cylindrical surfaces adapted to contact the cylindrical surface of the gauge member so as to apply wear creating friction thereto, means movably mounting each wear member so as to be movable transversely to the axis of the gauge member but substantially non-movable along said axis, and means for applying pressure against each wear member so as to press it against the gauge member.

7. A wear testing mechanism for testing a gauge member having a cylindrical gauge surface comprising a support, a driven shaft on said support, a frame slidably mounted on said support for movement transversely to said shaft, means interconnecting said shaft and frame for effecting reciprocation of said frame on said support upon rotation of said shaft, a rotary, second shaft journaled in said frame and being movable with the frame, means on one end of the second shaft for carrying the gauge member, wear members having cylindrical surfaces adapted to contact the cylindrical surface of the gauge member so as to apply wear creating friction thereto, means movably mounting each wear member so as to be movable transversely to the axis of the gauge member but substantially non-movable along said axis, means for applying pressure against each wear member so as to press it against the gauge member and comprising a pivoted lever operatively engaging the wear member, and means for applying constant pressure to move the lever in one direction.

8. A wear testing mechanism for testing a gauge member having a cylindrical gauge surface comprising a support, means on the support for repeatedly reciprocating the gauge along its axis, means for turning the gauge periodically, wear members having cylindrical surfaces for contacting the cylindrical surface of the gauge member, means movably mounting the wear members on the support so that they may have full surface contact with the gauge member, and means on the support for pressing each wear member against the gauge member and comprising a pin slidable along a line directed at right angles to and intersecting the axis of reciprocation of the gauge member and at one end contacting the external surface of the wear member substantially at a point centrally of the cylindrical surface thereof, and a weighted lever pivoted on the support and engaging the other end of the pin for pressing it against the wear member.

GEORGE HOHWART.